United States Patent [19]

Hill

[11] Patent Number: 5,377,934

[45] Date of Patent: Jan. 3, 1995

[54] HELICOPTER CONVERSION

[76] Inventor: Jamie R. Hill, 1325 SE Fourth St., Cape Coral, Fla. 33904

[21] Appl. No.: 8,541

[22] Filed: Jan. 25, 1993

[51] Int. Cl.$^6$ .................................................. B64C 27/00
[52] U.S. Cl. ............................... 244/17.11; 244/117 R
[58] Field of Search ............... 244/17.11, 117 R, 119, 244/120

[56] References Cited

U.S. PATENT DOCUMENTS

| | | | |
|---|---|---|---|
| 2,132,529 | 10/1938 | Firner | 244/119 |
| 2,183,323 | 12/1939 | Moss | 244/119 |
| 2,228,253 | 1/1941 | Berliner | 244/117 R |
| 3,902,688 | 9/1975 | Seibel et al. | 244/17.11 |
| 4,342,146 | 8/1982 | Hanson | 244/120 |
| 4,676,545 | 6/1987 | Bonfilio et al. | 244/120 |
| 4,741,497 | 5/1988 | Fox | 244/119 |

Primary Examiner—Galen L. Barefoot

[57] ABSTRACT

A method of converting an existing helicopter airframe, such as a UH-1H/V or a UH-1D, to a special purpose use such as, for example, a gunship or a firefighter, and a helicopter constructed thereby. The process takes a conventional, multi-passenger, helicopter from a primary design use to a second, un-anticipated use after the primary function has ceased. The invention converts the helicopter from a dual-piloted, multi-passenger aircraft to a helicopter gunship flown by a single operator/pilot. Modifying the aircraft involves stripping the entire shell from the basic boxlike airframe, removing all of the equipment and accessories, and re-assembling the aircraft with a slimmer profile, reduced weight, and improved performance.

2 Claims, 9 Drawing Sheets

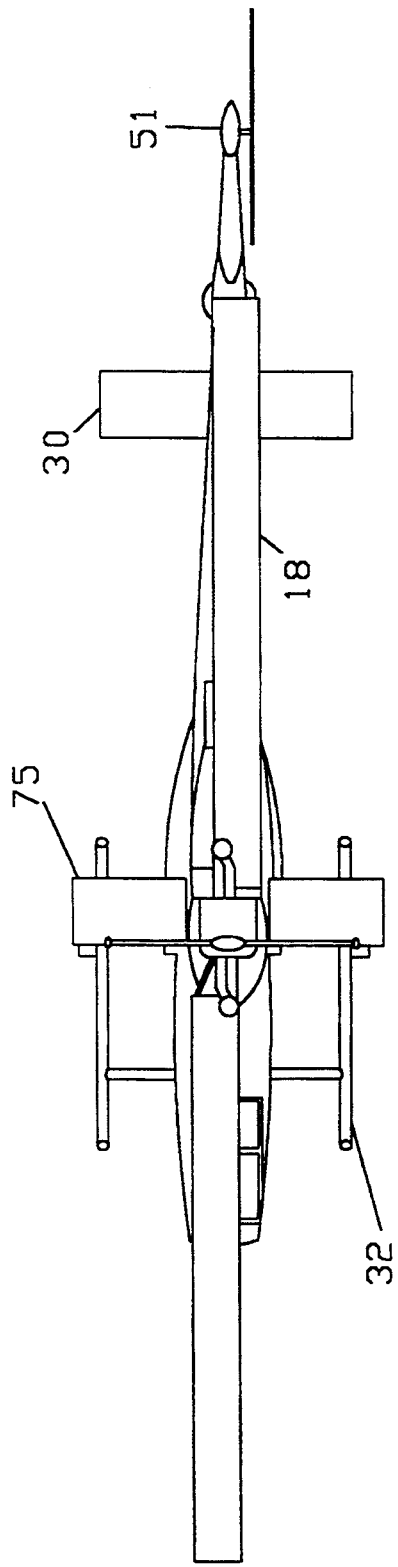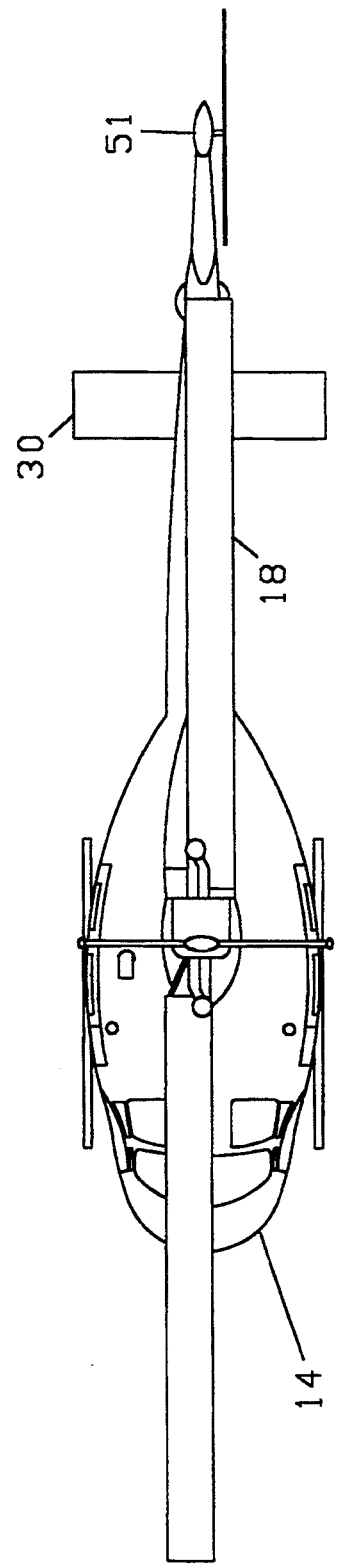

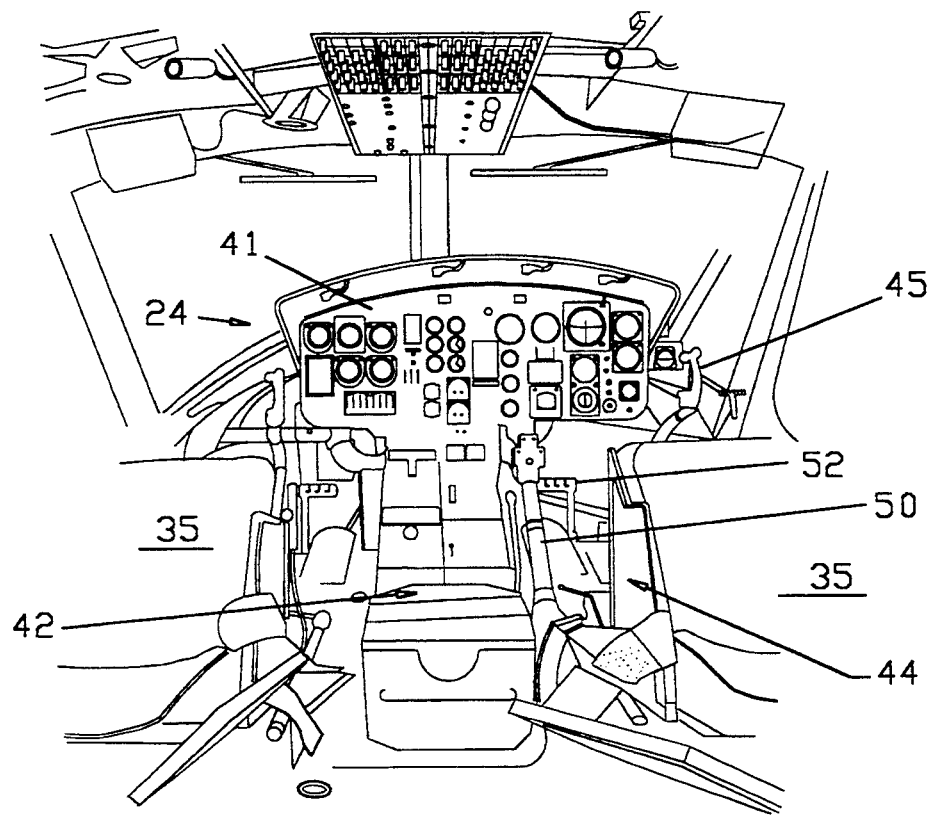
FIG.13
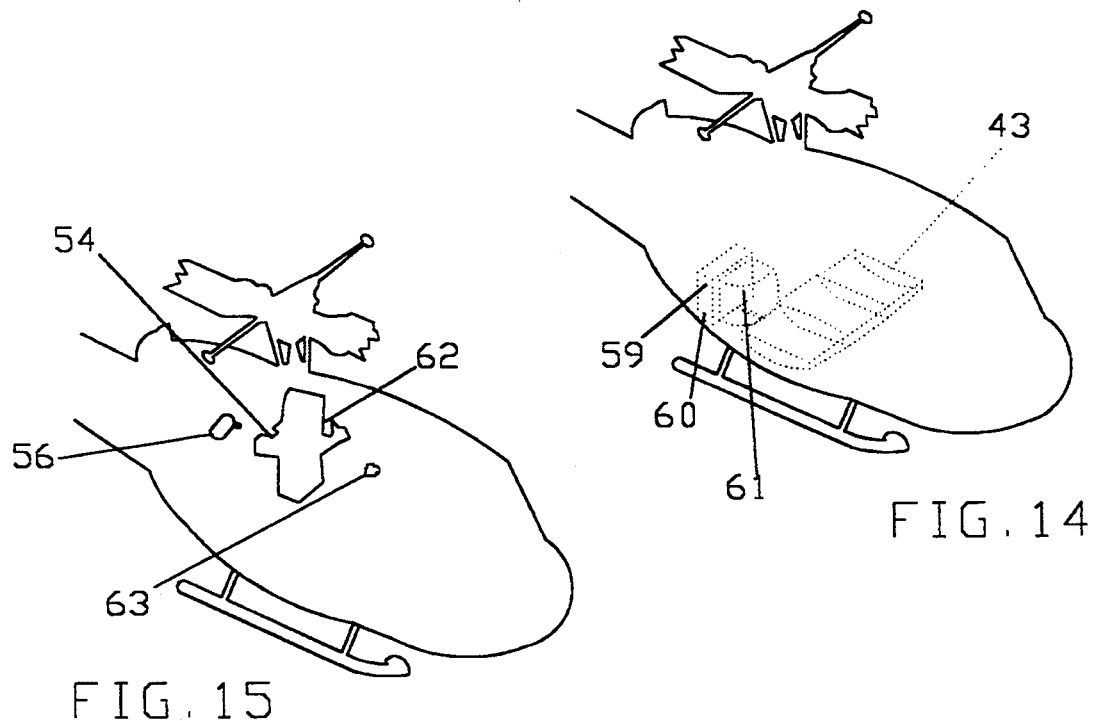
FIG.15
FIG.14

HELICOPTER CONVERSION

BACKGROUND OF THE INVENTION

1. Field of the Invention

This invention relates generally to helicopters and more particularly to a method of converting an existing helicopter airframe to a special purpose use such as, for example, a gunship or a firefighter and a helicopter constructed thereby.

2. Discussion of the Prior Art

Several special purpose helicopters have been developed. One such special purpose helicopter is disclosed in U.S. Pat. No. 3,327,969 to Head which discloses a helicopter which is adapted for in-flight conversion from a helicopter type of flight to a conventional airplane type of flight and vice versa.

U.S. Pat. No. 3,902,688 to Seibel et al discloses a helicopter converted to a gunship wherein a pair of horizontal stabilizers are mounted on a vertical stabilizer as to be outside the fuselage wake in forward flight. The vertical distance between the tips of the vertical stabilizer is made sufficient to keep one horizontal stabilizer out of the high downwash region behind the fuselage at all angles of attack. A large horizontal stabilizer is mounted high enough above the tail boom to be outside the high velocity main rotor wake. The ratio of the areas of the upper and lower horizontal stabilizers is 70:30 for optimum pitch moment characteristics.

U.S. Pat. No. 3,921,938 to Jupe et al discloses a helicopter converted to fit into a small storage area such as on a ship. The main rotor blades are foldable forwardly to a stowed position above a forward part of the fuselage and the tail boom from a longitudinal center line of the fuselage and foldable forwardly to a stowed position along one side of the fuselage to significantly reduce the folded dimensions of the helicopter over existing configurations, which is a very important criterion when the helicopter has to be stowed in a confined space such as a ship's hangar. The fuselage is provided with a large rear access fitted with clam type doors which can be folded to an open position adjacent each side of the fuselage to further reduce the overall length in the folded configuration.

U.S. Pat. No. 3,327,969 to Head discloses an aircraft adapted for in-flight conversion from a helicopter type of flight to a conventional airplane type of flight, and vice versa.

U.S. Pat. No. 3,635,426 to Stanley discloses a rotary wing transport aircraft especially adapted for short haul transport service, having rotor blade jet devices providing torqueless rotor drive, outboard propulsive airscrews, and gas generators or gas turbine engines some of which provide for drive of the outboard airscrews and at least one of which provides hot effluent gas which is somewhat cooled by mixing with air or water and then fed to the rotor driving jet devices.

U.S. Pat. No. 3,520,497 to Schramm, discloses a frame work for a helicopter which is especially suitable for, but not limited to, a one-man helicopter which is tough, springy, light of weight, and able to absorb extraordinary loads with minimum damage to the structure and its occupant. The construction includes a minimum number of parts and is readily adapted to the use of bent steel tubing in a welded structure.

Each of the above prior art patents pertain to original modifications in the conventional design of aircraft to accomplish a specific, unique operation. None of the references deal with the process of taking a conventional, multi-passenger helicopter from a primary design use to a second, un-anticipated use after the primary function has ceased. In particular, the process of the invention utilizes conventional military and/or civilian helicopters, which have, for one reason or another been declared surplus and in many cases, scrapped, and produces a less complex, inexpensive, lighter weight, special purpose, helicopter. In a first embodiment, the invention converts the helicopter from a dual-piloted, multi-passenger aircraft to a helicopter gunship flown by a single operator/pilot. Other potential special uses include observation aircraft, fire fighting or emergency rescue.

SUMMARY OF THE INVENTION

The helicopter produced by this invention is a helicopter gunship based on a highly successful airframe power train and engine, but would be modified so as to provide greatly enhanced performance, payload, speed and maneuverability. The invention may be armed with a nose turret, remote controlled 20 mm cannon or heavy machine gun and a wide selection of rockets and missiles on stub wings. Vulnerable portions of the helicopter, to include the cockpit, engine and transmission, would be armor plated.

The invention produces a technically sound, relatively unsophisticated and rugged aircraft, which would enjoy low operating costs, simple maintenance procedures and be designed for use in the low intensity warfare which will characterize the forseeable future. By modifying existing airframes and using totally remanufactured engines and components, the cost of production of the invention will be about one third that of the Bell AH-1 Cobra gunship. The relatively low cost, reliability and performance of the gunship would insure a substantial worldwide market, particularly among countries who do not anticipate engagements on high intensity battlefields.

It is therefore an object of the invention to produce a helicopter gunship or other special use aircraft from the skeleton of an existing helicopter airframe.

It is another object of the invention to produce a helicopter gunship from an existing helicopter airframe using the same engine, transmission and other dynamic components to insure reliability and ease of maintenance.

These and other objects will become more clear upon a consideration of the following description of a preferred embodiment.

BRIEF DESCRIPTION OF THE DRAWINGS

FIG. 7 is a top view of a helicopter gunship in accordance with the invention.

FIG. 8 is a top view of a prior art helicopter.

FIG. 13 is a perspective view of the crew compartment of a prior art helicopter.

FIG. 14 is a schematic view showing the location of the fuel tanks of a prior art helicopter.

FIG. 15 is a schematic view of a prior art helicopter showing the position of the transmission.

DESCRIPTION OF THE PREFERRED EMBODIMENT

Figure 1:
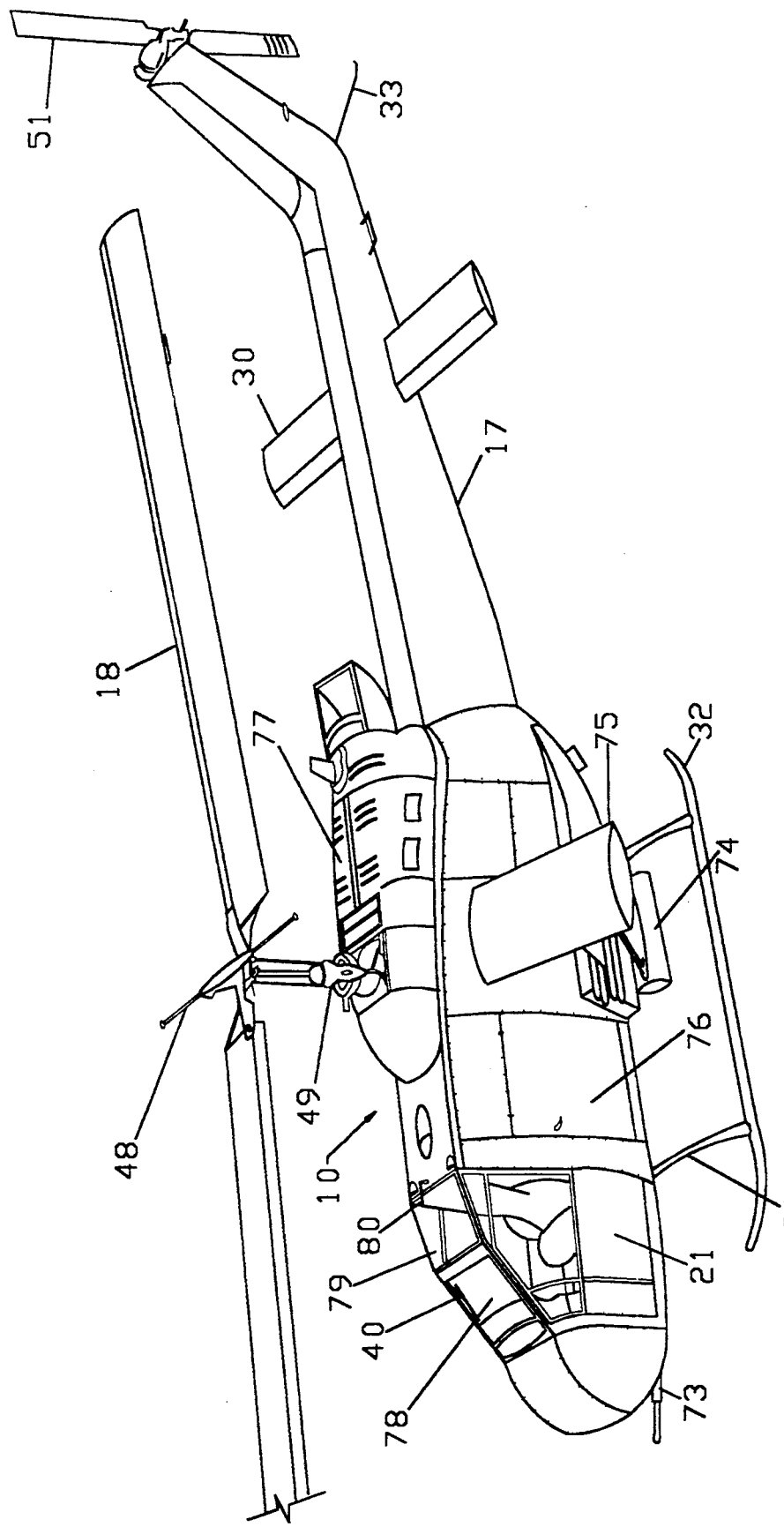
FIG. 1 is a helicopter gunship in accordance with the present invention.

The invention is a process of converting an existing helicopter airframe into a helicopter gunship or other special use aircraft and the resulting helicopter having new and enhanced capabilities. The helicopter gunship produced by the process of the invention is shown in FIG. 1. A prior art helicopter, for example, a UH-1H/V is shown in FIGS. 1, 5, 6, and 8 in various views. The new, reconstructed profile of the invention is shown in comparable views in FIGS. 1, 3, 4, and 7 for direct comparison. It is readily apparent from examining the drawings that the invention provides a drastically changed, reduced size, compact aircraft generally designated by the numeral 10.

The aircraft 10 of the invention is basically a slimmed down version of the original aircraft 11. A primary objective of the invention is to utilize the original, existing, boxlike structure of the airframe 12, which is a box-like structure with a vertical tower section 58 upon which the exterior surfaces and all other equipment, including the engine, are mounted. Utilizing the original airframe 12, permits the use of all other manufacturer standard equipment such as the engine and transmission, landing skids, tail boom, and flight controls and equipment. Extensive airframe modifications will reduce the total width of the fuselage from 8' 6" to about 3' 8", modify the cockpit to single pilot configuration, slightly shorten the machine overall, give the aircraft a more aerodynamic nose and provide for the installation of stub wings. The standard Lycoming T53-L-13B engine would be fitted to the Aircraft 10 in its original configuration. The engine is considered to be adequate given the very considerable reduction in weight achieved by cutting the crew from four men to one, and the reduction of about 1,000 pounds from the fuselage and airframe.

For a helicopter gunship version of aircraft 10, it is highly desirable to armorplate certain vulnerable portions of the aircraft. Recent combat experience has indicated the need for armor around the engine, pilot, and certain other critical components. It is calculated that about 1,000 pounds of the operating weight can be devoted to armor plating of sufficient thickness to turn a 7.62 mm rifle bullet at close range. Actual details of the armoring, including a decision to install bulletproof glass would be discretionary.

Figure 2:
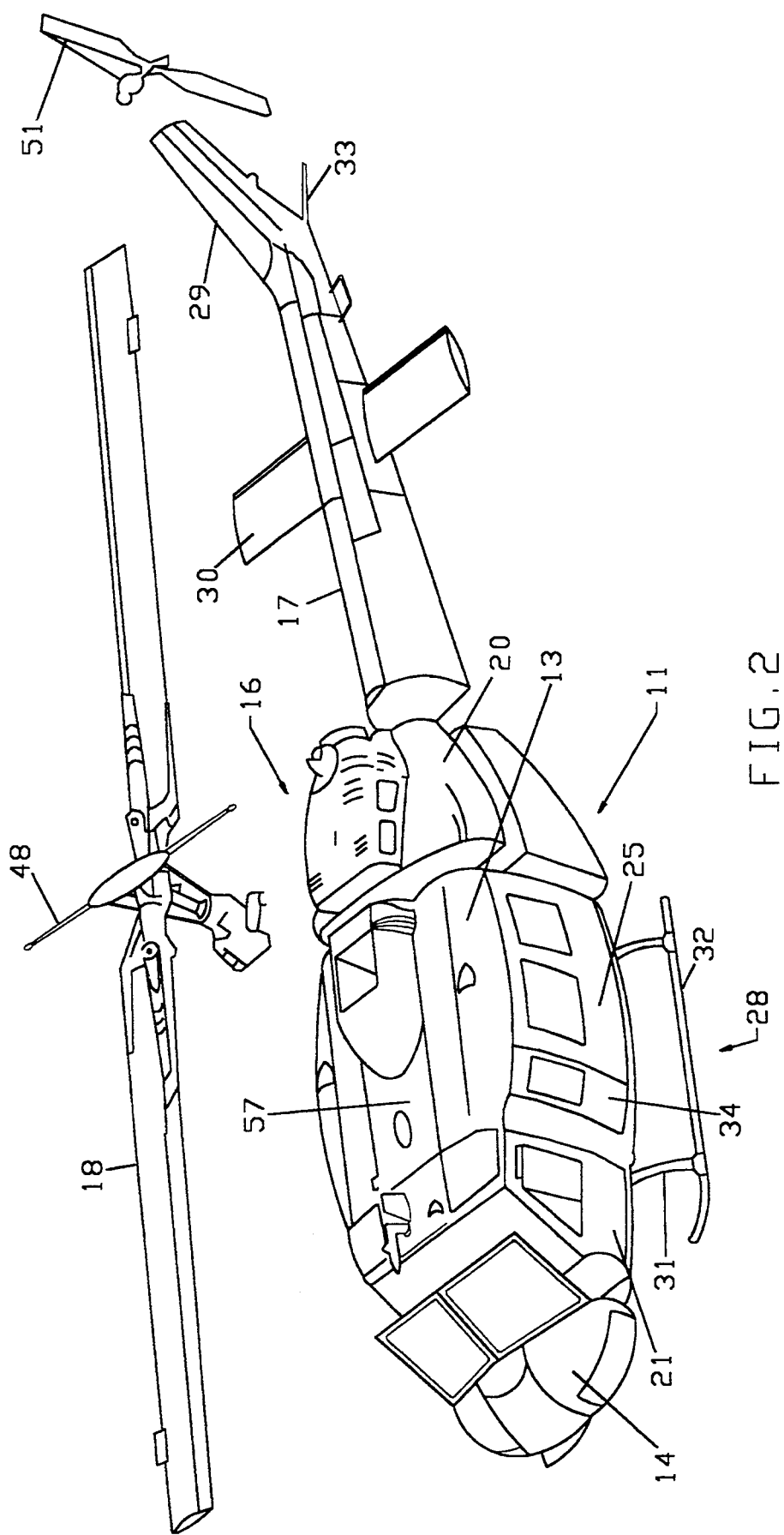
FIG. 2 is an exploded, perspective view of a prior art helicopter.
Figure 3:
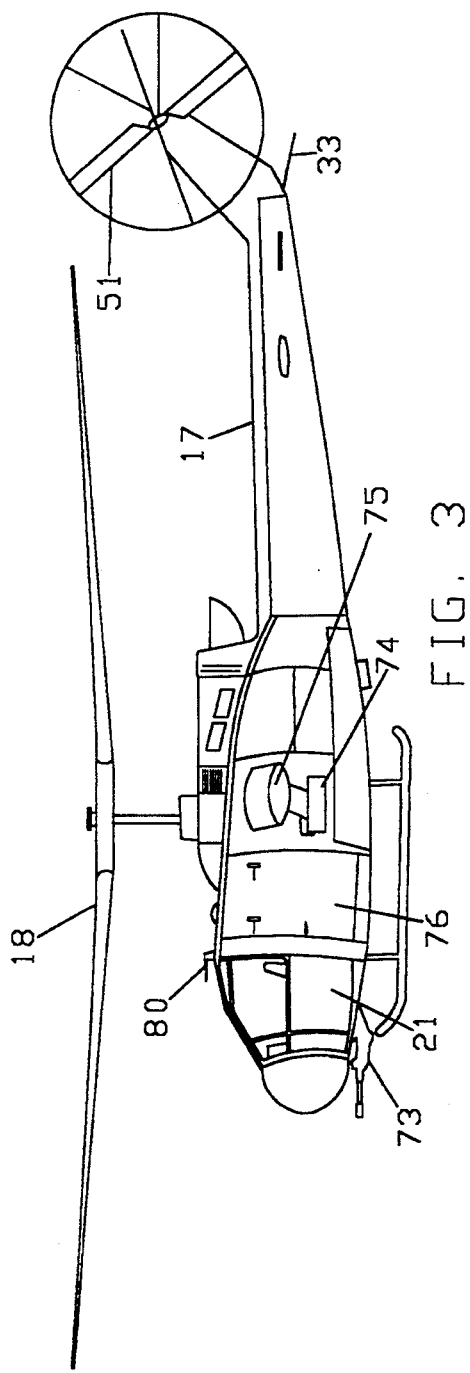
FIG. 3 is a side view of a helicopter gunship in accordance with the invention.
Figure 5:
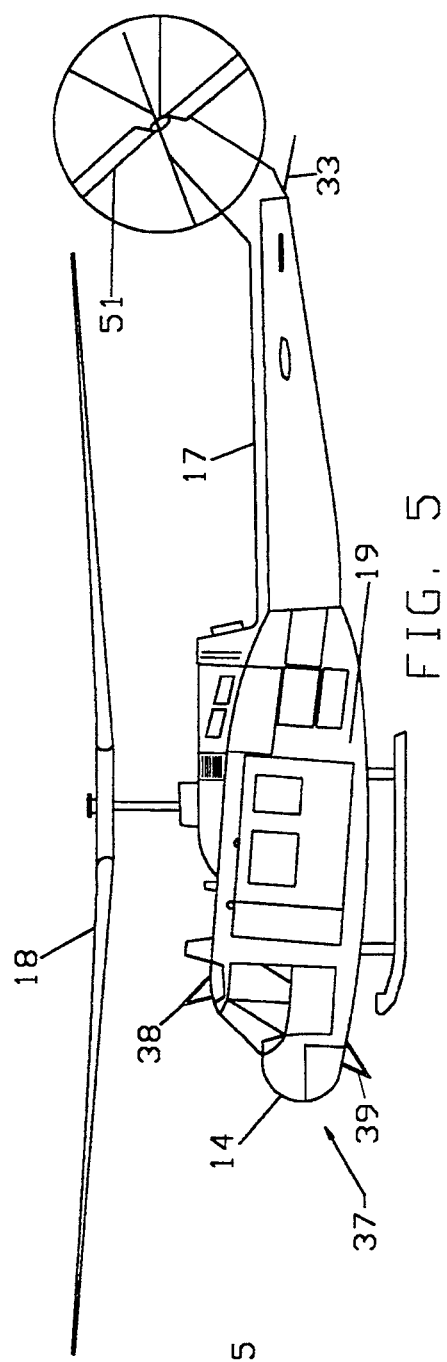
FIG. 5 is a side view of a prior art helicopter.
Figure 4:
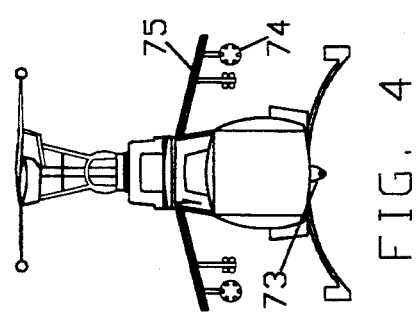
FIG. 4 is a front view of a helicopter gunship in accordance with the invention.
Figure 6:
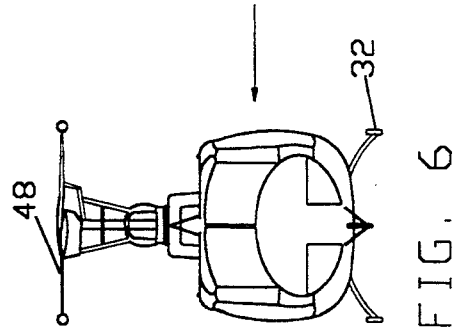
FIG. 6 is a front view of a prior art helicopter.

Referring now to FIG. 2, which shows an exploded, perspective view of a prior art helicopter aircraft 11, the aircraft 11 exterior is generally designated by numeral 13. Aircraft 11 is generally shown in the following sections, the nose area 14, cabin 15, engine area 16, tailboom section 17, and rotor 18. Airframe 12 extends from the nose area 14 to the forward end of the tailboom 17. The airframe 12 consists primarily of two longitudinal main beams 26 with transverse bulkheads 27 and metal covering. The main beams 26 are the supporting structure for the cabin 15, landing gear 28, fuel tanks, transmission, engine, and tailboom 17. The external cargo suspension unit is attached to the main beams 26 near the center of gravity (CG) of the helicopter.

The tailboom section 17 is bolted to the aft end of the airframe 12 and extends to the aft end of the helicopter. The tailboom section 17 is a tapered, semi-monocoque structure comprised of skins, longerons, and stringers. The tailboom 17 supports the tail rotor 18, vertical fin 29, and synchronized elevator 30. The tailboom section 17 houses the tail rotor drive shaft and some electronic equipment.

Main landing gear 28 consists of two aluminum arched crosstubes 31 mounted laterally on the airframe 12 with two longitudinal skid tubes 32 attached to the crosstubes 31. The skid tubes 32 are made of aluminum and have steel skid shoes attached to the bottom to minimize skid wear.

A tubular steel tail skid 33 is installed on the aft end of the tailboom 17. The tail skid acts as a warning to the pilot upon an inadvertent tail-low landing and aids in protecting the tail rotor 18 from damage.

The two cabin doors 25 are formed aluminum frames with transparent plastic windows in the upper section. The doors 25 are on rollers and slide aft to the open position allowing full access to the cargo area. Hinged door post panels 34 are forward of the cabin doors 25. The panels 34 provide a larger entrance to the cargo area.

The pilot seats 35 may be conventional seats or armored seats. The armored seats have a release to recline the seats to aid in removal of injured personnel. The seat back, bottom, and sides are protected by ceramic and aluminum armor plate. Hip and shoulder areas are protected by ceramic type armor.

A wire strike protection system (WSPS) provides protection for 90% of the frontal area against impacts with horizontally strung mechanical and power transmission cables. The basic WSPS system 37 consists of an upper cutter/deflector 38, and a lower cutter/deflector 39.

The UH-1H/V helicopter is equipped with a T53-L-13 engine. The engine area 16 compartment is cooled by natural convection through engine compartment screens. Three different air induction systems are used on these helicopters, a non-self-purging particle separator, a self-purging particle separator and a foreign object damage screen. All engine instruments and indicators are mounted in the instrument panel 41 and the pedestal 42. FIG. 15 shows the locations of the transmission 62, hydraulic oil reservoir 63 and engine oil reservoir 64.

The fuel system 43 consists of five interconnected cells all filled from a single fuel filler 59 on the right side of the helicopter, grounded by receptacle 60, or auxiliary filler 61. The crash worthy system is designed to contain fuel during a severe, but survivable, crash impact to reduce the possibility of fire. Frangible fittings used to secure the fuel cells in the airframe are designed to fail and permit relative movement of the cells, without rupture, in the event of a crash; self sealing breakaway valves are installed in the fuel lines at the fuel cell outlets and certain other locations. The breakaway valves are designed to permit complete separation of components without loss of fuel.

The flight control system 44, shown in FIG. 13, is a hydraulic assisted positive mechanical type, actuated by conventional helicopter controls. Complete controls are provided for both pilot and copilot. The cyclic control system is operated by the cyclic control stick 45 movement. Moving the stick 45 in any direction will produce a corresponding movement of the helicopter which is a result of a change of rotation of the main rotor 18. Force centering devices are incorporated in the cyclic control system and directional pedal controls 52. These devices are incorporated in the cyclic control stick 45 and directional pedal controls 52. These devices are installed between the cyclic stick 45 and the hydraulic servo cylinders, and between the anti-torque pedals 52 and the hydraulic servo cylinder. The devices furnish a force gradient or "feel" to the cyclic control stick 45 and anti-torque pedals 52.

The synchronized elevator 30 is located on the tailboom 17. It is connected by control tubes and mechanical linkage to the fore and aft cyclic control stick 45. Fore and aft movement of the cyclic control stick 45 will produce a change in the synchronized elevator 30 attitude. This improves the controllability within the CG range.

The stabilizer bar 48 is mounted on the main rotor hub trunnion assembly 49 in a parallel plane, above and at 90° to the main rotor blades 18. The gyroscopic and inertial effect of the stabilizer bar 48 will produce a damping force in the rotor rotating control system and thus the rotor 18. When an angular displacement of the helicopter/mast occurs, the bar 18 tends to remain in its trim plane. The rate at which the bar 18 rotational plane tends to return to a position perpendicular to the mast is controlled by the hydraulic dampers, positive dynamic stability can be achieved, and still allow the pilot complete responsive control of the helicopter.

The main rotor 18 is a two bladed, semi rigid, seesaw type. The two blades are connected to a common yoke by blade grips and pitch change bearing with tension straps to carry centrifugal forces. The rotor assembly is connected to the mast with a nut. Blade pitch change is accomplished by movements of the collective 50 and cyclic control stick 45. The main rotor 18 is driven by the transmission 54 through the mast.

The collective control lever 50 controls vertical flight. When the lever 50 is in full down position, the main rotor 18 is at minimum pitch. When the lever 50 is in the full up position, the main rotor 18 is at maximum pitch. The amount of lever 50 movement determines the angle of attack and lift developed by the main rotor 18, and results in ascent or descent of the helicopter. The hydraulic pump 53 is used to minimize the force required by the pilot to move the cyclic control stick 45, collective 50, and pedal controls 52. The hydraulic pump 53, mounted on and driven by the transmission 54 supplies pressure to the hydraulic system connected into the mechanical linkage of the helicopter flight control system. The hydraulic reservoir 56 is a gravity feed type and is located at the right aft edge of the cabin roof.

The transmission 62 is mounted forward of the engine and coupled to the power turbine shaft at the cool end of the engine by the main drive shaft. The transmission 62 is basically a reduction gearbox, used to transmit engine power at a reduced rpm to the rotor system. A freewheeling unit is incorporated in the transmission to provide a quick-disconnect from the engine if a power failure occurs. The tail rotor drive 54 is on the lower aft section of the transmission 62. Power is transmitted to the tail rotor 51 through a series of drive shafts and gear boxes. The rotor tachometer generator, hydraulic pump, and main DC generator are mounted on and driven by the transmission 62.

The tail rotor control system 47 is operated by the pilot/copilot anti-torque pedal controls 52. Pushing a pedal control 52 will change the pitch of tail rotor 51 resulting in directional control. The tail rotor 51 is a two-bladed, semi-rigid, delta-hinge type. Each blade is connected to a common yoke by a grip and pitch change bearing. The hub and blade assembly is mounted on the tail rotor 51 with a delta-hinge trunnion and a static stop to minimize rotor 51 flapping. Blade pitch change is accomplished by movement of the anti-torque pedals 52 which are connected to a pitch control system 47 through the tail rotor (90 degree) gearbox 55. Blade pitch change serves to offset torque and provide heading control.

The process of the invention is not limited to any particular order of modification and may be conveniently started by removing the nose area 14. The tail boom 17, may then be removed and stored until reattachment to the airframe 12 when the aircraft 10 modifications are completed. Tail boom 17, not usually requiring modification, is used in aircraft 10 essentially as produced by the manufacturer.

Modifying the exterior 13 of the cabin 15 comprises the removal of the exterior skin and cabin sides 19, engine area exterior 20, cabin top 57, cockpit doors 21, cabin doors 25, crew seats 22, flight controls 23 and instruments 24. Removal of the cabin sides 19 includes the vertical ribs and spars upon which the exterior surfaces 13 are affixed. Removal of cabin sides 19 and other structures involves either removing fasteners and/or cutting material. All internal equipment such as the engine, transmission, flight controls, communications gear, fuel tanks, batteries, etc. are removed to facilitate access to internal spaces for installing new flight controls and equipment to meet special mission requirements.

Figure 9:
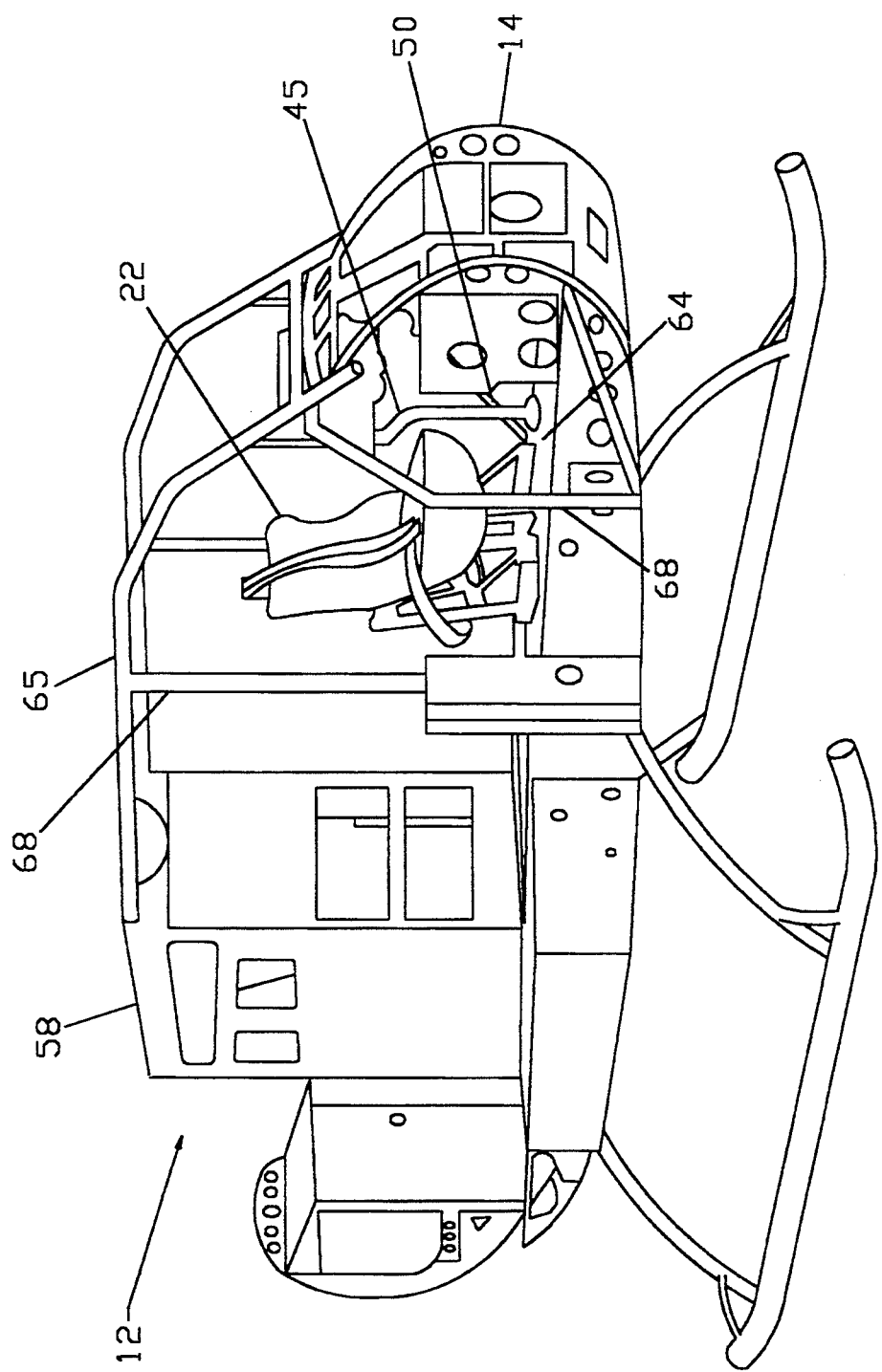
FIG. 9 is a perspective view of the basic frame of a prior art helicopter.
Figure 10:
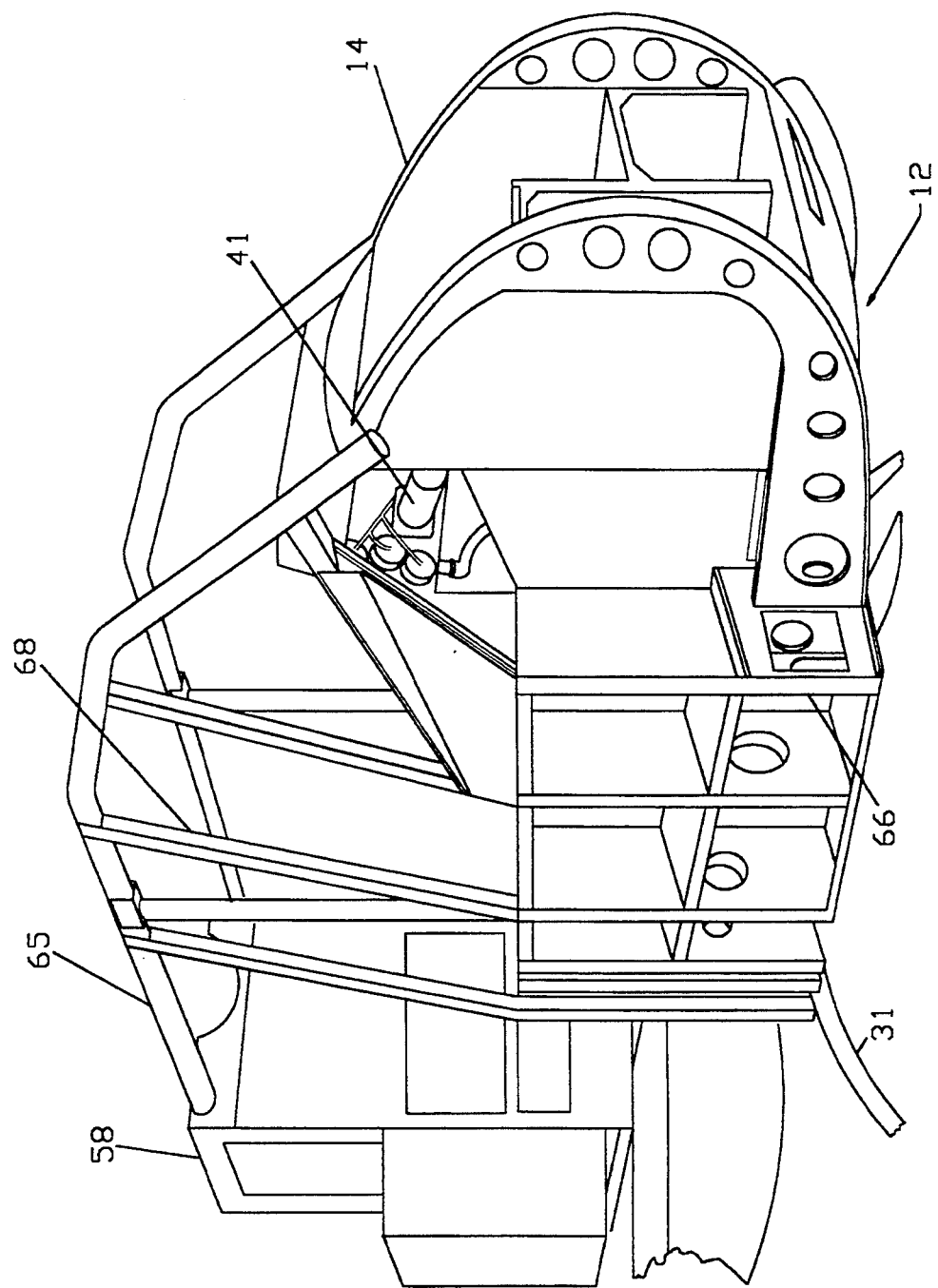
FIG. 10 is a perspective view of the beginning steps of building up the outer airframe.
Figure 11:
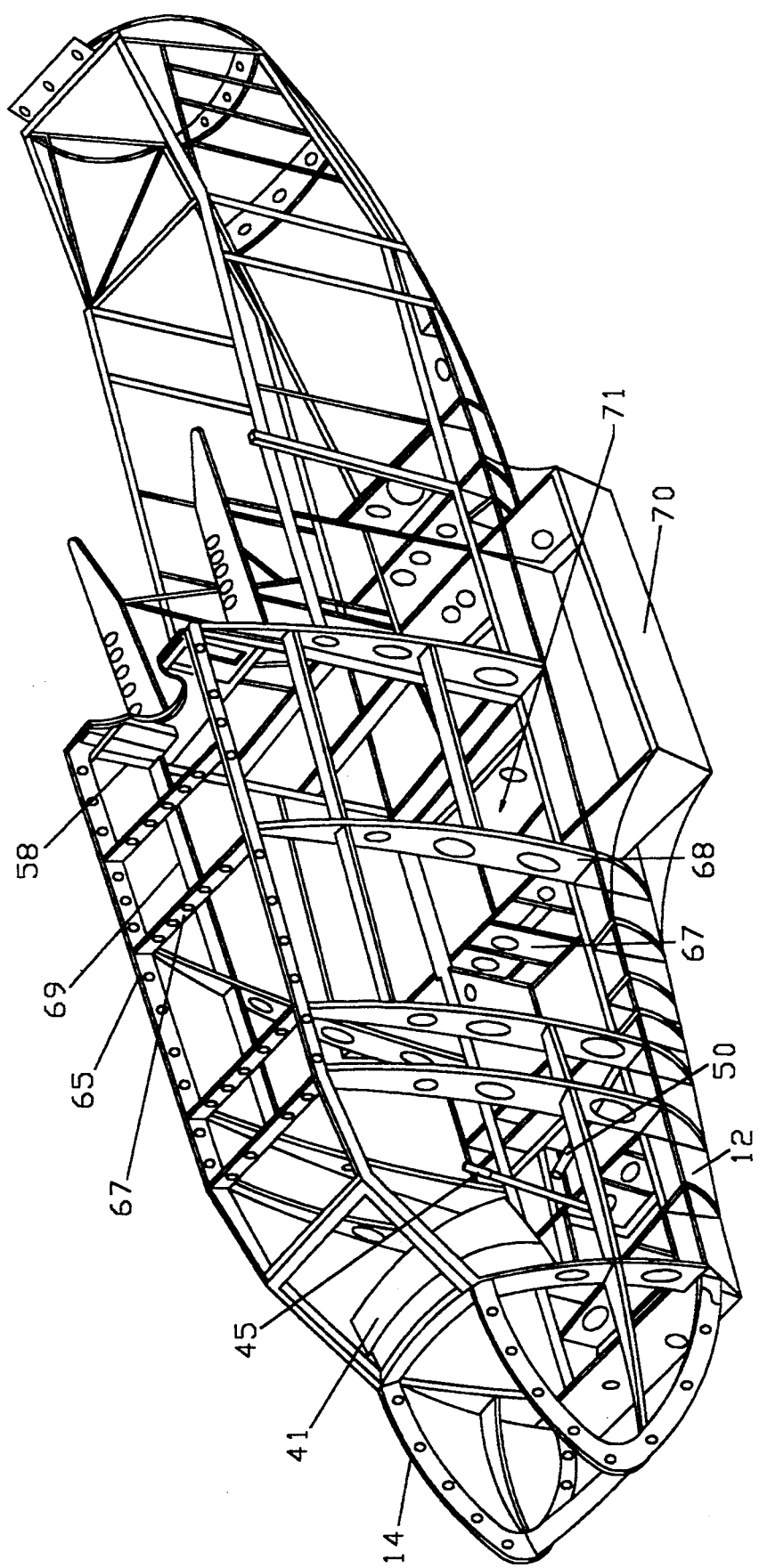
FIG. 11 is a perspective view of the skeleton of an airframe of the instant invention.
Figure 12:
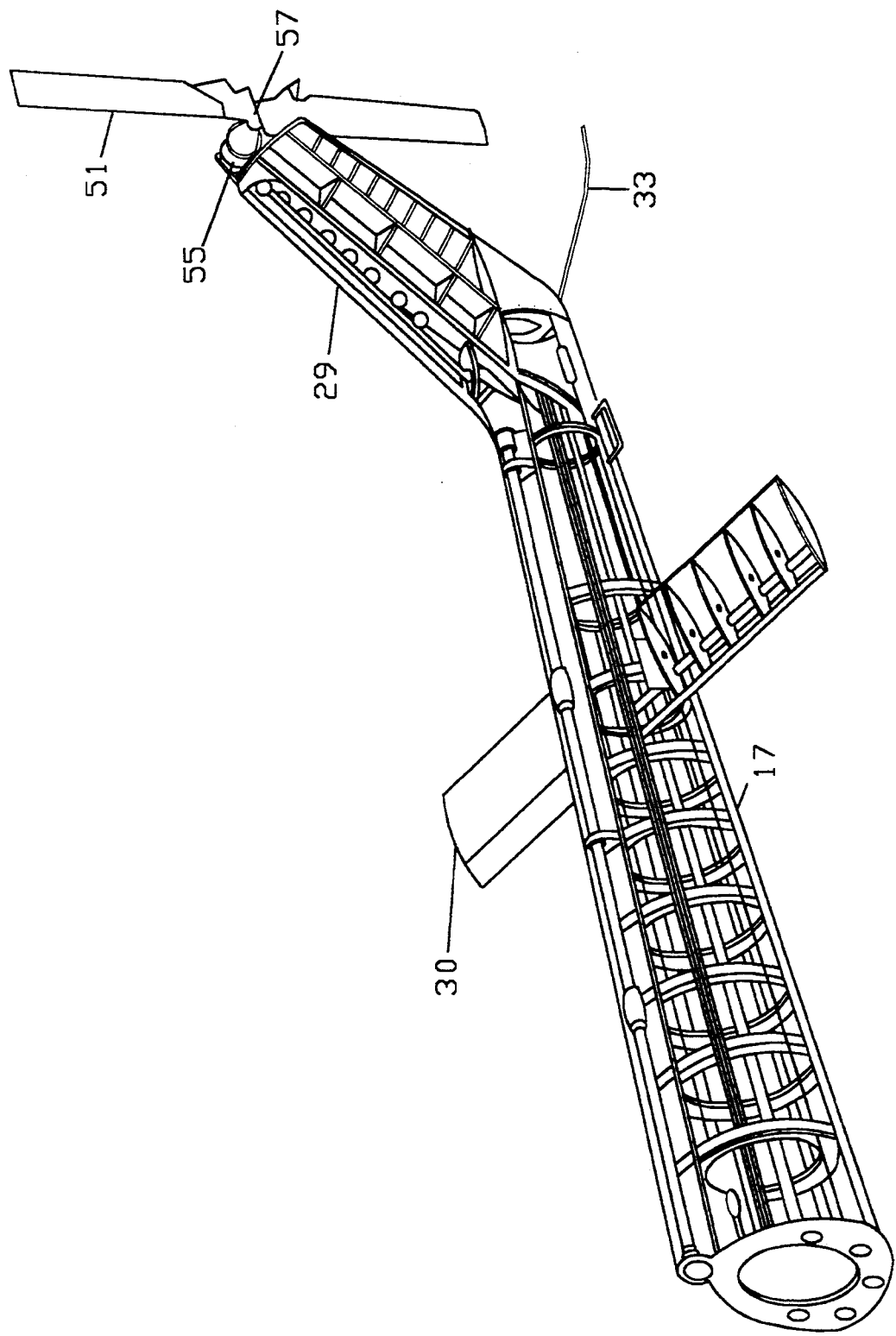
FIG. 12 is a perspective view of the skeleton of a tail section of the invention.

FIG. 9 shows the basic airframe 12 after the removal of all of the equipment and structures mentioned above. Reconstruction of the helicopter 10 may begin by the installation of the cyclic control stick 45, collective control lever 50, and the appropriate connecting levers and rods comprising the control system running through the cross members 67 located in the airframe 12. Crew seat 22 is installed in the appropriate position on the deck 64, in front of instrument panel 41. A pair of longitudinal, tubular members 65, connect vertical tower section 58 to nose area 14. Assembly of the sides and top of the helicopter 10 are started with attachment of the vertical members 68 to the airframe 12 and the tubular members 65 with fasteners or by welding. Vertical members 68 may be tubular, as shown in FIG. 9, or shaped as shown in FIG. 11. The skeleton structure is continued by adding additional vertical members 68, stringers 69, and cross members 67.

The fuel system 43 may be installed in outward boxes 70, or interior compartment 71 of airframe 12. Transmission drive system 62, (1,250 SHP T.O., 1,100 SHP Continuous) with transmission oil cooler, hydraulic pump for controls, freewheeling unit (between engine and main transmission) and tail rotor drive 54 are installed in the original position shown in FIG. 15.

The electrical system of the helicopter gunship 10 may consist of a generator (30 volt, 300 ampere D.C. starter generator), two inverters (Class B, 250 volt ampere, 3 Phase), a nickel cadmium battery (34 ampere hours), voltage regulator, navigation lights, retractable landing light, anti-collision lights, searchlight-controllable, cockpit light, and an external power receptacle.

instruments 24 include the following: free air temperature indicator, altimeter (pressure), eight day clock, magnetic compass, airspeed indicator, exhaust gas temperature indicator, gas producer tachometer indicator, torque meter indicator, D.C. voltmeter, A.C. voltmeter, loadmeter, engine out, rate of climb indicator, turn and slip indicator, attitude indicator (3 axis Gyro 5 inch face), dual tachometer (rotor and engine), engine oil-temperature indicator, engine oil-pressure indicator, master caution indicator, RPM warning light, fuel pressure indicator, transmission oil-temperature indicator and transmission oil-pressure indicator. Also included is a master caution system-when limits are approached, warning lights (with appropriate wording) draws attention to: engine oil pressure, engine icing, engine ice detector, engine de-ice on, left fuel boost, right fuel boost, engine fuel pump, 20 minute fuel, fuel filter, emergency governor, oil filter, transmission oil pressure, transmission oil hot, hydraulic pressure, instrument inverter, D.C. generator and spares.

The helicopter gunship 10 will also be equipped with engine exhaust and infrared suppression kit, turbine air inlet covers, tail pipe cover, ground handling wheels, main rotor tie-down assembly and tail rotor tie down strap.

Reconstructing the exterior 13 will depend on the intended application of the helicopter 10. FIG. 1 shows a helicopter gunship embodiment with armor plate installed in appropriate positions to protect the well-being of the pilot as well as critical equipment necessary for the survival of the aircraft in combat. It is highly desirable to armorplate certain vulnerable portions of the gunship. Recent combat experience has indicated the need for armor around the engine, pilot and certain other components. It is calculated that about 1,000 pounds of the operating weight can be devoted to armor plating of sufficient thickness to turn a 7.62 mm rifle bullet at close range. Actual details of the armoring, including a decision to install bulletproof glass 78, would be left to the discretion of the user.

The remainder of the exterior 13 is standard grade aircraft aluminum or other appropriate material. Other types of material which may be used are titanium, or composite materials, for example. In other applications of the reconstructed helicopter 10, as for example, fire fighting, aircraft grade aluminum alloy will generally be used. The tail boom 17, which is essentially in its standard condition, is re-attached to the airframe 12 at a convenient time.

The standard Lycoming T53-L-13B (1,800 SHP gas turbine) engine would be fitted to the gunship 10 in its original configuration. This is considered to be adequate given the considerable reduction in weight achieved by cutting the crew from four men to one, and the reduction of about 1,000 pounds from the fuselage and airframe. The engine 16 would include a starter (integral with generator), governor (automatic), power turbine control actuator, ice detector with automatic anti-icing, magnetic chip detector, oil cooler (turbine type), fire detection system, and RPM warning system. The fuel system would include 220 U.S. gal. capacity, 215 U.S. gal. usable, pumps (submerged in tanks and on engine), and a fuel filter assembly.

In a preferred embodiment, standard permanently installed main armament 73 will be a rapid fire 0.50 caliber or 20 mm cannon in a remote controlled automatic turret located under the chin of the helicopter 10. The Lucas gun turret coupled with a Sperry helmet sight appears to be the most readily available rig. Rockets and missiles 74 can be mounted on stub wings 75, to include the 2.75 inch air-to-ground rocket, various anti-tank missiles, napalm canisters, gas dispensers and other munitions.

By substantially modifying the original design with the addition of stub wings 75 and reduction of the frontal area of the helicopter 10, the overall weight of the craft will be lightened. It is expected that performance figures will dramatically increase, especially in the realm of acceleration, climb rates, cruise and top speed. The airfoil cross section of the stub wings 75 are designed to maximize lift in this flight regime. The actual length of the wings 75 will be longer than most prior art stub wings to increase lift appreciably.

Appropriate communication and navigation equipment as well as navigation lights are also to be installed in the areas designated for such equipment.

Swingout jettisonable doors 21, are provided on either side of the cockpit. Swingout panels 76 for extended access to the aft cabin, and hinged service access covers 77 are provided in areas requiring routine maintenance. The main rotor hub 49, stabilizer bar 48 and rotor blades 18 are reinstalled in the same manner as they were on the original aircraft. The rotor and controls include a semi-rigid main rotor 18, a semi-rigid, two bladed all metal tail rotor 51, stabilizer bar 48, and dampers. All controls are hydraulically boosted. A force-trim system on cyclic and directional controls and an RPM governor selector control are also included.

A single windshield wiper 40 is installed over windshield 78. Overhead window 79 is tinted for comfort of the crew. Pitot tube 80 is installed on the top of the fuselage directly aft of the overhead window 79.

When the modification is completed, the following helicopter and performance characteristics result: length-57 feet, height-13.4 feet, width at elevators-7 feet, width fuselage-3 feet, 8 inches, rotor span-48 feet, and weight-5,000 pounds (empty) approximately. The performance of the aircraft is: VNE-165 knots, cruise-150 knots, Max. gross weight-10,500 pounds, payload-5,500 pounds plus, and rate of climb-3,000 feet per minute (approximately).

In a second embodiment, it would be highly desirable to produce a gunship with twin engines, probably the well proven P&W PT6 TwinPac, which would provide a dramatic increase in lifting power, reliability and combat survivability. An interim modification would be installation of the Lycoming T53-L-703 engine with 1,800 shp rather than the standard dash 13 with 1,400 shp. Another useful modification would be the replacement of the skids with retractable, or semi-retractable, landing gear, or fixed wheels. Such modification would allow easier ground maneuvering, less drag airborne and the ability to takeoff with heavier combat loads than with skids since the helicopter could be rolled off the ground.

As mentioned above, one prior art helicopter which may be converted by the process of the invention, is the UH-1H/V. A second model, the UH-1D, may also be converted by the process of the invention.

The first embodiment of the helicopter gunship 10 will be single-piloted, but a growth version with a copilot/gunner, mounted in tandem would be desirable as the helicopter grows from a daytime VFR gunship to one with all weather capabilities.

This invention is not to be limited by the embodiments shown in the drawings and described in the description, which is given by way of example and not of limitation, but only in accordance with the scope of the appended claims.

I claim:

1. A special purpose helicopter conversion of a UH-1H/V and/or UH-1D helicopter, a dual piloted, multi-passenger airframe, power train, and engine, for providing greatly enhanced performance, payload, speed and maneuverability, said helicopter comprising:

a boxlike airframe structure reduced in size and shape from a dual piloted, multi-passenger helicopter, to a single pilot configuration with an aft cabin, said airframe structure having a vertical tower section and a nose section, a pair of longitudinal members connecting said vertical tower section to said nose area, said structure providing a lighter weight, narrower airframe than said dual-piloted, multi-passenger UH-1H/V and/or UH-D airframe for mounting exterior surfaces and all other equipment, including the engine and transmission, landing skids, tail boom, fuel system, electrical system, and flight controls and equipment, a single pilot's seat, a single flight control system, and a single flight instrument panel, mounted on said airframe, an engine, transmission, rotor and controls and accessories mounted on said vertical tower section, new, reduced profile, nose area, vertical ribs and horizontal spars affixed to said airframe, an exterior skin and cabin sides, glass panels, swing-out, jettisonable doors, swingout panels for access to an aft cabin, hinged service access covers, and all other accessories and equipment required for the intended mission, installed on said boxlike airframe structure, and a standard design tailboom and rotor attached to said airframe, whereby a highly successful helicopter airframe, power train, and engine are converted to provide greatly enhanced performance, payload, speed and maneuverability.

2. A special purpose helicopter of claim 1 wherein armor plating is installed around said engine, pilot's seat, and other critical equipment, stub wings are installed on each side of said helicopter, a rapid firing armament is installed under the airframe in a forward position, and rocket and missile canisters are installed underneath each of said stub wings.

* * * * *